United States Patent [19]

Stewart et al.

[11] Patent Number: 4,556,696

[45] Date of Patent: Dec. 3, 1985

[54] PROCESS TO FORM FILM FROM BLENDS OF POLYCAPROLACTAM AND POLY(HEXAMETHYLENE ADIPAMIDE)

[75] Inventors: Donald F. Stewart, Whippany; Michael F. Tubridy, Budd Lake; Herbert J. Huthwaite, Florham Park, all of N.J.

[73] Assignee: Allied Corporation, Morris Township, Morris County, N.J.

[21] Appl. No.: 604,256

[22] Filed: Apr. 26, 1984

[51] Int. Cl.[4] ...................... C08G 69/48; C08L 77/00
[52] U.S. Cl. ................ 525/432; 428/475.5; 264/514; 264/564
[58] Field of Search ............ 525/432; 428/475.5; 264/514, 564

[56] References Cited

U.S. PATENT DOCUMENTS

| | | | |
|---|---|---|---|
| 2,698,966 | 1/1955 | Stott et al. | 525/432 |
| 2,852,485 | 9/1958 | Stott et al. | 525/432 |
| 3,995,084 | 11/1976 | Berger et al. | 428/475.5 |
| 4,462,779 | 7/1984 | Brinkmeier et al. | 264/564 |

OTHER PUBLICATIONS

Regan, John F., Cast Film Process for Zytel® Nylon Resins, E. I. Du Pont de Nemours & Co., (Inc.) (Sep. 15, 1970).
Regan, John F., Blown Film Process for Zytel® Nylon Resins, E. I. Du Pont de Nemours & Co., (Inc.) (Sep. 15, 1970).

*Primary Examiner*—John C. Bleutge
*Assistant Examiner*—A. L. Carrillo
*Attorney, Agent, or Firm*—Richard A. Negin; Arthur J. Plantamura; Jay P. Friedenson

[57] ABSTRACT

The present invention is a process to form a composition comprising from 5 to 50% by weight and preferably from 10 to 30% by weight polycaprolactam and from 50 to 95% by weight and preferably 70 to 90% by weight poly(hexamethylene adipamide). The process comprises heating the composition to from 440° to 505° F. and preferably 450° to 485° F. The preferred forming process is to form the composition into a film.

10 Claims, No Drawings

PROCESS TO FORM FILM FROM BLENDS OF POLYCAPROLACTAM AND POLY(HEXAMETHYLENE ADIPAMIDE)

BACKGROUND OF THE INVENTION

The present invention relates to a process to form a polyamide composition comprising a blend of polycaprolactam and poly(hexamethylene adipamide); more particularly, the invention relates to a process to form a film from such a composition.

Films made of polyamides, including polycaprolactam (nylon 6) and poly(hexamethylene adipamide) (nylon 6, 6), are well known. Polycaprolactam and poly(hexamethylene adipamide) films have similar properties as might be expected from their common polyamide family background. There are distinguishing characteristics between polycaprolactam and poly(hexamethylene adipamide). Generally, polycaprolactam is a tougher, more flexible polymer than poly(hexamethylene adipamide). When formed into film, these properties result in a tougher, more flexible film. Poly(hexamethylene adipamide) results in a stiffer film having slightly higher tensile properties.

In addition to these above-noted differences in physical properties, a common difference in properties between polycaprolactam and poly(hexamethylene adipamide) is their melting points. Polycaprolactam typically melts at a temperature of 215° C. to 225° C. (419° F. to 437° F.). While poly(hexamethylene adipamide) melts at a temperature range of about 240° C. to 265° C. (464° F. to 509° F.). These differences in melting temperature are important in the areas of melting to process the polymer as well as indicating the differences in use temperature of the polymers. The differences in melt temperature are particularly important in considering forming films using blown film processing.

When forming films using blown film processing, a tube is extruded and inflated with air. A bubble forms immediately after the extruder die. The maintenance of the desired bubble configuration is sensitive to temperature. It is desirable to maintain the temperature of the film passing through the bubble as low as possible so that the film is relatively stiff and the bubble will not collapse. It is also desirable to maintain the film temperature low so that the bubble can be collapsed without the inner walls of the bubble sticking together. The lower the temperature of the film passing through the bubble, the faster the bubble can be collapsed and the film passed to the next processing step.

SUMMARY OF THE INVENTION

The present invention is a process to form or shape a composition comprising from 5 to 50% by weight and preferably from 10 to 30% by weight polycaprolactam and from 50 to 95% by weight and preferably 70 to 90% by weight poly(hexamethylene adipamide). The process comprises heating the composition to from 440° F. to 505° F. (263° C.) and preferably 450° F. (232° C.) to 485° F. (252° C.). The preferred forming process is to form the composition into a film.

The process of the present invention has been found particularly useful in forming film by the blown film process where the composition is extruded through a blown film die to form a tube of film, and air is blown into the tube. This process results in a film having biaxial orientation. The process can be used to form cast film. The cast film process results in an amorphous film which is made by quenching an extrudate onto a casting roll.

DESCRIPTION OF THE PREFERRED EMBODIMENTS

The present invention is directed to a process to form a composition comprising from 5 to 50 and preferably 10 to 30% by weight polycaprolactam and from 50 to 95 and preferably 70 to 90% by weight poly(hexamethylene adipamide). The percents are by weight based on the total weight of polycaprolactam and poly(hexamethylene adipamide) in the composition. The composition can be formed by suitable means known in the art to form blends of thermoplastic polymers.

A uniform composition for use in the process of the present invention can be made by first physically blending pellets or powder of polycaprolactam and poly(hexamethylene adipamide). The blended mixture can then be melt blended to make a uniform, homogeneous blend. A preferred way to make this blend is by blending the composition in the melt in a suitable mixing means such as an extruder. The blends can be then formed directly in line with the extruder, or the blend can be formed into a suitable form, such as pellets, for later use.

The composition of the present invention is heated to a temperature of from about 440° F. (227° C.) to about 505° F. (263° C.) and preferably about 450° F. (232° C.) to about 485° F. (252° C.) and formed. The composition of the present invention has been found to be useful in forming films by methods known in the art including the cast film process, and the blown film process. The composition has been found to be particularly useful in the blown film process.

The polyamides useful in the present invention are polyepsiloncaprolactam (polycaprolactam, nylon 6) and poly(hexamethylene adipamide) (nylon 6,6). Useful polyamides preferably have a relative formic acid viscosity of from 50 to about 200 measured in 90% formic acid at a concentration of 9.2 weight percent.

The polycaprolactam can be prepared by the polymerization of epsilon-caprolactam by means known in the art. The poly(hexamethylene adipamide) can be prepared by the condensation of hexamethylene diamine with adipic acid by methods also known in the art.

The polyamides can contain various terminal functionality including carboxylic acid group termination and amino group termination. The polyamides can be terminated by acids, amides, or a mixture thereof.

The polyamide compositions can contain conventional additives such as stabilizers; inhibitors of oxidative, thermo and ultra-violet light degradation; lubricants; plasticizers; mold release agents; colorants including dies and pigments; fillers; nucleating agents, etc.

As indicated above, polycaprolactam has a lower melt temperature, 419° F. (215° C.) to 437° F. (225° C.) than poly(hexamethylene adipamide), 464° F. (240° C.) to 509° F. (265° C.). Polycaprolactam can be processed at low temperatures of from 440° F. (227° C.) to 505° F. (263° C.) and preferably 450° F. (232° C.) to 485° F. (252° C.). Poly(hexamethylene adipamide) is typically melt processed at above 510° F. (266° C.).

Polyamides can be processed to form films by conventional film forming processes including cast film processes and blown film processes. A typical cast film process with attendant conditions and equipment useful to make cast nylon film is described in Regan, J. F., *CAST FILM PROCESS FOR ZYTEL® NYLON RESINS*, published by E. I. DuPont DeNemour & Company, hereby incorporated by reference. A typical blown film process for nylon resins is disclosed in Regan, J. F., *BLOWN FILM PROCESS FOR ZYTEL NYLON RESINS*, published by E. I. DuPont DeNemour & Company, hereby incorporated by reference. Both of the above references are particularly directed toward forming nylon 6,6 film.

Briefly, cast film is formed by extruding a uniformed molten film from a slit die onto a casting roll in a continuous manner. The extrusion and casting operations are carried out simultaneously. A detailed description of extrusion is disclosed in the Cast Film Process article referenced above at pages 4 through 16. The extrudate passes from the extruder, through an adaptor, then a die, and to a casting roll. The extrudate is cooled on the casting roll resulting in an amorphous film. A discussion of a typical casting process is in the Regan reference on Cast Film Process beginning at page 16 through page 19. The film then passes over other processing rolls which can include annealing and idler rolls, and finally passes to a windup station where it is wound up. The casting of film is well known in the art and this particular process is cited as a preferred process for illustrative purposes. Beginning at page 34 of the Cast Film Process article, conditions are indicated for extrusion of poly(hexamethylene adipamide) based polymers. The processing melt temperture is no lower than 520° F. (271° C.).

The Blown Film Process article provides a similar specification for forming film by the blown film process. Blown film forming is known in the art and the Regan article is cited as illustrative of a preferred method of forming blown film. The composition is first extruded and then passes through an adaptor. Rather than extruding the film through a flat film die as in the cast film process, the film is extruded through a circular die. There is an air port or other suitable means to blow air into the extrudate tube coming from the circular die. Upon leaving the die, the tube expands and forms a "bubble". The expansion causes orientation in the circumferential direction. The film can additionally be elongated in the axial direction by exerting tension on the film prior to winding it up. Typical processing conditions for poly(hexamethylene adypamide) film are shown at pages 41 and 42 of the Blown Film Process article. In no case is the melt temperature of the poly(hexamethylene adipamide) used to form the film below 510° F. (266° C.).

The forming of polycaprolactam film by either the cast film process or the blown film process a similar analogous processes as disclosed in both of the Regan articles. The only difference is that the conditions would be set at lower temperatures throughout the process. Typically, polycaprolactam film is processed at approximately 35° F. to 70° F. (19° C.-38° C.) lower than the temperatures indicated for poly(hexamethylene adipamide) film or at from about 440° F. (227° C.) to about 505° F. (263° C.) and preferably 450° F. (232° C.) to 485° F. (252° C.). As noted, the melting point of the polycaprolactam is approximately 40° F. (22° C.) lower than that poly(hexamethylene adipamide).

The physical properties of poly(hexamethylene adypamide) can be improved by the addition of 5 to 50 and preferably 10 to 30% by weight of polycaprolactam. The addition of polycaprolactam to the poly(hexamethylene adipamide) results in a more flexible and tough composition, while at the same time sacrificing some tensile properties. Surprisingly, it has been found that such blends can be processed at the conditions useful to process compositions made of 100% polycaprolactam. The use of lower temperatures has many of the expected and desirable advantages of processing polymers at lower temperatures.

A particularly useful advantage has been found in forming blown films. The conditions typically used to form blown polycaprolactam films can be used with the blends of the present invention. The prefered melt temperature of the blend entering the die is from about 450° F. (232° C.) to about 475° F. (246° C.) and most preferably about 460° F. (238° C.). This results in the typical advantages of using lower temperatures. In the Blown Film Process, the use of the lower temperature with the blend results in a satisfactory bubble forming from the extruder. An important advantage of the process of the present invention is that the lower polycaprolactam processing conditions result in the blown film in the bubble being at a low temperature. This enables the film to be collapsed move quickly without the inner surfaces of the bubble sticking to each other. The faster the film is cooled to temperature at which the film can be collapsed results in more film production through the blown film process equipment. This is because the cooling of the bubble is typically the slowest portion of the blown film process.

The present invention includes a film containing the composition of the present invention. It is thought that the composition of the present invention results in the polycaprolactam acting as a plasticizer or internal lubricant for the poly(hexamethylene adipamide) enabling the blend to form a film at the lower temperatures.

The film of the present invention can be formed into laminates and/or coated. The film can be formed into laminates by coextrusion. The polyamide in the film can have excess terminal amine groups and be formed into the laminates as described in U.S. Pat. No. 4,215,176 hereby incorporated by reference.

The following examples are set forth below to illustrate the nature of the invention and the method of carrying it out. However, the invention should not be considered as being limited to the details thereof.

EXAMPLE 1

A composition containing 73.5 percent by weight nylon 6,6, 24.5 percent by weight nylon 6, 1 percent by weight blue pigment, and 1 percent by weight lauryl lactam as a plasticizer was formed into film having thicknesses of 2 mil and 3 mil. The nylon 6,6 was Zytel® 42HSB produced by DuPont. The nylon 6 was Capron® 8207F produced by Allied Corporation having relative formic acid viscosity of 70 measured in 90 percent formic acid at a concentration of 9.2 percent by weight. The blue pigment was CNY4893 produced by Reed Plastics Corporation.

The conditions and equipment used were those described in "Cast Film Process for Zytel® Nylon Resines" by J. F. Regan referenced above, and are summarized below except that the casting roll temperature was 185° F.

| EQUIPMENT | |
|---|---|
| extruder size: | 3¼"; 24/1 L/D |
| screw: | 10/5/9 turns of |

| EQUIPMENT | |
|---|---|
| | feed/transition/metering; 3.5/1 compression ratio; depth of metering 0.110". |
| screens: | 40/120/40 mesh. |
| die: | 30" wide; center fed; taper tube type with flex lips |

| PROCESS CONDITIONS | |
|---|---|
| Temperatures (°F.) | Setting/Actual |
| Extruder - Rear Barrel | 550/548 |
| Rear Center Barrel | 550/550 |
| Center Barrel | 550/545 |
| Front Center Barrel | 550/555 |
| Front Barrel | 550/555 |
| Adaptor | 550/550 |
| Neck | 550/545 |
| Die Front | 575/565 |
| Die Center Front | 565/565 |
| Die Center | 560/560 |
| Die Center Rear | 565/560 |
| Die Rear | 575/570 |
| Die Lips | 550/550 |
| Melt Temperature (°F.) | 575 |
| Melt Pressure (psi) | 2100 |
| Take-Off (FPM) | 210 |
| Screw (RPM) | 45 |
| Chill Roll Temperature (°F.) | 185 |
| Annealing Roll Temperature (°F.) | 230 |

EXAMPLE 2

The composition of Example 1 was used to make blown film in accordance with the equipment and process disclosed in the "Blown Film Process for Zytel ® Nylon Resins" by J. F. Regan referenced above and summarized below, except that the temperature conditions used were the same as typical used for nylon 6 film. The temperatures are summarized below. The nylon blend melt temperature was about 470° F. This is lower than the suggested melt temperature of 545° F. for nylon 6,6 (page 42 of Regan).

| EQUIPMENT | |
|---|---|
| Extruder Size | 3¼" |
| Extruder Drive | 125 HP |
| Screw | 24/1, L/D - 10 turns of feed, 5 turns of transition, 9 turns of metering. Metering Depth, 130 mils, compression ratio 3.5/1. |
| Screen Pack | 2-40 mesh, 2-100 mesh. |
| Die Diameter | 16" |
| Air Ring | 18" with tapered inserts |

| PROCESS CONDITIONS | |
|---|---|
| Temperature Settings: | |
| Extruder Conditions (°F.) | |
| zone 1 | 480 |
| zone 2 | 500 |
| zone 3 | 475 |
| zone 4 | 475 |
| Head/Gate | 440 |
| Adapter | 460 |
| Rotator | 500 |
| Die Temperatures (°F.) | |
| zone 1 | 460 |
| zone 2 | 460 |
| Inside | 440 |
| Screw Speed | |
| Varies between 25-40 rpm, depending on bubble size. | |
| Pressure Adaptor | 2400 psi |
| Screw Speed | 25-40 rpm |
| Throughput | 300 pph |
| Line Speed | 95 fpm |
| Frost Line Height | 8" |
| Lay-flat Width | 54" |
| Caliper | 1.0 mils |
| Blow-up Ratio | 2.2/1 |

While exemplary embodiments of the invention have been described, the true scope of the invention is to be determined from the following claims:

What is claimed is:

1. A process to form a film from a composition comprising from 5 to 30 percent polycaprolactam and from 50 to 95 percent poly(hexamethylene adipamide) comprising the steps of: heating the composition to from about 440° F. (227° C.) to about 485° F. (252° C.), and forming the composition into a film.

2. The process of claim 1 wherein the composition comprises from 10 to 30 percent polycaprolactam.

3. The process of claim 1 wherein the composition is heated to from 450° F. (232° C.) to 485° F. (252° C.).

4. The process of claim 1 wherein the step of forming the composition into a film further comprises extruding the composition through a blown film die to form a tube of film; and blowing air into the tube.

5. The process as recited in claim 4 wherein the temperature of the composition entering the blown film die is from 450° F. (232° C.) to 475° F. (246° C.).

6. The process of claim 1 further comprising the step of forming the film into a laminate 7. The process as recited in claim 6 wherein the film is coextruded to form a laminate.

8. A film made by the process of claim 1.

9. A film comprised of from 5 to 30 percent polycaprolactam and from 50 to 95 percent poly(hexamethylene adipamide).

10. The film of claim 9 comprising from 10 to 30 percent polycaprolactam.

* * * * *

UNITED STATES PATENT AND TRADEMARK OFFICE
CERTIFICATE OF CORRECTION

PATENT NO. : 4,556,696

DATED : December 3, 1985

INVENTOR(S) : Donald F. Stewart, Michael F. Tubridy and Herbert J. Huthwaite

It is certified that error appears in the above-identified patent and that said Letters Patent is hereby corrected as shown below:

Col. 6, line 36, "50" should read --70--.

Col. 6, line 52, "alaminate" should read --a laminate--.

Col. 6, line 57, "50" should read --70--.

Signed and Sealed this

Thirty-first Day of March, 1987

*Attest:*

DONALD J. QUIGG

*Attesting Officer*  *Commissioner of Patents and Trademarks*